United States Patent
Yamada et al.

(10) Patent No.: US 9,893,371 B2
(45) Date of Patent: Feb. 13, 2018

(54) FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/186,614

(22) Filed: Jun. 20, 2016

(65) Prior Publication Data
US 2016/0380283 A1 Dec. 29, 2016

(30) Foreign Application Priority Data
Jun. 26, 2015 (JP) .................................. 2015-128356

(51) Int. Cl.
*H01M 8/04223* (2016.01)
*H01M 8/04119* (2016.01)
(Continued)

(52) U.S. Cl.
CPC ... *H01M 8/04179* (2013.01); *H01M 8/04007* (2013.01); *H01M 8/04201* (2013.01); *H01M 8/04228* (2016.02); *H01M 8/04303* (2016.02); *H01M 8/04365* (2013.01); *H01M 8/04373* (2013.01); *H01M 8/04731* (2013.01);
(Continued)

(58) Field of Classification Search
CPC ......... H01M 8/04228; H01M 8/04694; H01M 8/04716
See application file for complete search history.

(56) References Cited

U.S. PATENT DOCUMENTS

2011/0065012 A1 3/2011 Kwon et al.
2012/0107706 A1* 5/2012 Tanaka .............. H01M 8/04253
429/415
(Continued)

FOREIGN PATENT DOCUMENTS

DE 10 2013 210 207 A1 12/2014
DE 10 2014 222 199 A1 5/2015
(Continued)

OTHER PUBLICATIONS

U.S. Appl. No. 14/933,410, filed Nov. 5, 2015.

*Primary Examiner* — Jeremiah Smith
(74) *Attorney, Agent, or Firm* — Finnegan, Henderson, Farabow, Garrett & Dunner, LLP

(57) ABSTRACT

There is provided a technique to suppress water from remaining in a fuel cell and auxiliary machines after a stop of operation of a fuel cell system. A fuel cell system 100 includes a controller 10, a fuel cell 20, a cathode gas supply discharge system 30 and an anode gas supply discharge circulation system 50. The controller 10 serves as a termination process controller 15 to control a termination process that is performed when operation of the fuel cell 20 is to be stopped. In the termination process, the termination process controller 15 performs a quick warm-up operation to quickly increase the temperature of the fuel cell 20, subsequently performs a standard warm-up operation that has a lower temperature rise rate of the fuel cell 20 than that in the quick warm-up operation, and then performs a purging process to purge the fuel cell 20.

4 Claims, 7 Drawing Sheets

(51) Int. Cl.
*H01M 8/04228* (2016.01)
*H01M 8/04007* (2016.01)
*H01M 8/04082* (2016.01)
*H01M 8/04701* (2016.01)
*H01M 8/04746* (2016.01)
*H01M 8/04303* (2016.01)
*H01M 8/0432* (2016.01)
*H01M 8/04029* (2016.01)
*H01M 8/04089* (2016.01)

(52) U.S. Cl.
CPC .... *H01M 8/04753* (2013.01); *H01M 8/04029* (2013.01); *H01M 8/0432* (2013.01); *H01M 8/04097* (2013.01); *H01M 8/04164* (2013.01); *H01M 8/04223* (2013.01); *H01M 2250/20* (2013.01); *Y02T 90/32* (2013.01)

(56) References Cited

U.S. PATENT DOCUMENTS

| | | | |
|---|---|---|---|
| 2013/0295480 A1* | 11/2013 | Ono | H01M 8/04664 429/429 |
| 2015/0125767 A1 | 5/2015 | Wake et al. | |
| 2016/0141685 A1 | 5/2016 | Toida et al. | |
| 2017/0047602 A1* | 2/2017 | Sato | H01M 8/04 |
| 2017/0084939 A1* | 3/2017 | Procter | H01M 8/04253 |
| 2017/0250418 A1* | 8/2017 | Onuma | H01M 8/04228 |

FOREIGN PATENT DOCUMENTS

| | | |
|---|---|---|
| JP | 2005-317264 | 11/2005 |
| JP | 2008-34309 | 2/2008 |
| JP | 2010-108757 | 5/2010 |

* cited by examiner

FUEL CELL SYSTEM

CROSS-REFERENCE TO RELATED APPLICATIONS

The present application claims priority from Japanese patent application (JP) 2015-128356 filed on Jun. 26, 2015, the content of which is hereby incorporated by reference into this application.

BACKGROUND

Field

The present invention relates to a fuel cell system.

Related Art

With regard to a polymer electrolyte fuel cell, hereinafter may be simply referred to as "fuel cell", a large amount of water is produced inside of the fuel cell during power generation. For example, JP 2008-034309A, JP 2010-108757A and JP 2005-317264A disclose examples of the fuel cell systems. Such fuel cell systems perform a process of removing water remaining inside of the fuel cell and inside of the system by purging or the like at an operation stop time of the fuel cell system, in order to suppress deterioration of the startability caused by freezing of the remaining water in a low temperature environment such as subzero environment.

At the operation stop time of the fuel cell system, it is preferable to perform a purging process to sufficiently remove water remaining inside of auxiliary machines involved in the flows of reactive gases and off-gases, such as valves and pumps. In the case of purging in a low temperature environment, however, the remaining water is likely to be frozen inside of such auxiliary machines. This may cause the remaining water inside of the auxiliary machines not to be sufficiently removed.

In the fuel cell systems described in JP 2010-108757A and JP 2005-317264A, a purging process and a heating process are performed for valves such as back pressure valves, for the purpose of removing water adhering to the valves. In the techniques of JP 2010-108757A and JP 2005-317264A, however, the purging process and the heating process for the valves are preformed independently of and separately from the purging process for the fuel cell. This is likely to decrease the system efficiency. In the fuel cell system, there is accordingly still a room for further improvement with regard to the technique of suppressing water from remaining in the fuel cell and the auxiliary machine after a stop of operation.

SUMMARY

In order to solve at least part of the above problems, the invention may be implemented by any of the following aspects.

(1) According to a first aspect of the invention, there is provided a fuel cell system. This fuel cell system may comprise a fuel cell, a reactive gas supplier, a gas-flowing auxiliary machine, a termination process controller, a cell temperature acquirer and an auxiliary machine temperature acquirer. The reactive gas supplier may be configured to supply a reactive gas to the fuel cell. The gas-flowing auxiliary machine may be provided in a passage which an off-gas discharged from the fuel cell flows through. The termination process controller may be configured to control execution of a termination process when operation of the fuel cell is to be stopped. The cell temperature acquirer may be configured to obtain cell temperature information that is information regarding temperature of the fuel cell. The auxiliary machine temperature acquirer may be configured to obtain auxiliary machine temperature information that is information regarding temperature of the gas-flowing auxiliary machine. In the termination process, the termination process controller may be configured to perform a first warm-up process, a second warm-up process and a purging process. The first warm-up process may cause the reactive gas supplier to supply the reactive gas to the fuel cell and thereby cause the fuel cell to generate electric power, so as to generate heat in the fuel cell. The second warm-up process may control an operating condition of the fuel cell so that an amount of temperature rise of the fuel cell per unit time in the second warm-up process is greater than an amount of temperature rise in the first warm-up process. The purging process may cause the reactive gas supplier to supply the reactive gas as a purge gas to the fuel cell, so as to purge at least the fuel cell and the gas-flowing auxiliary machine. The termination process may include a process of performing the second warm-up process, subsequently performing the first warm-up process and then performing the purging process, based on the cell temperature information and the auxiliary machine temperature information. The fuel cell system of this aspect causes the temperatures of both the fuel cell and the gas-flowing auxiliary machine to be increased prior to the purging process. This enhances the effect of removing the remaining water by the purging process.

(2) In the fuel cell system of the above aspect, the cell temperature acquirer may directly or indirectly measure the temperature of the fuel cell and obtain a cell temperature indicating the temperature of the fuel cell as the cell temperature information. The auxiliary machine temperature acquirer may directly or indirectly measure the temperature of the gas-flowing auxiliary machine and obtain an auxiliary machine temperature indicating the temperature of the gas-flowing auxiliary machine as the auxiliary machine temperature information. The termination process controller may change over from the second warm-up process to the first warm-up process, when the cell temperature becomes higher than a predetermined first cell temperature reference value and the auxiliary machine temperature is equal or lower than a predetermined auxiliary machine temperature reference value after a start of the second warm-up process. The termination process controller may perform the purging process when the cell temperature becomes higher than a predetermined second cell temperature reference value that is higher than the first cell temperature reference value. The fuel cell system of this aspect causes the first warm-up process, the second warm-up process and the purging process to be performed at more appropriate timings according to the actual temperature of the fuel cell and the actual temperature of the gas-flowing auxiliary machine.

(3) In the fuel cell system of the above aspect, after a changeover from the second warm-up process to the first warm-up process and a start of the first warm-up process, when the auxiliary machine temperature becomes higher than the auxiliary machine temperature reference value, the termination process controller may perform the second warm-up process again in a state that the cell temperature is lower than the second cell temperature reference value. The fuel cell system of this aspect enables the temperature of the fuel cell to be increased efficiently in a shorter time period, prior to the purging process.

(4) In the fuel cell system of the above aspect, the termination process controller may decrease a supply amount of an oxidizing gas included in the reactive gas relative to an amount of power generation of the fuel cell in the second warm-up process to be less than a supply amount of the oxidizing gas in the first warm-up process, so as to increase the amount of temperature rise of the fuel cell per unit time in the second warm-up process. The fuel cell system of this aspect efficiently allows for an easy changeover between the first warm-up process and the second warm-up process by controlling the supply of the reactive gas to the fuel cell, without using any additional auxiliary machine or the like to heat the fuel cell.

All the plurality of components included in each of the aspects of the invention described above are not essential, but some components among the plurality of components may be appropriately changed, omitted or replaced with other additional components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the invention described above may be combined with part or all of the technical features included in another aspect of the invention described above to provide one independent aspect of the invention.

The invention may be implemented by any of various aspects other than the fuel cell system described above, for example, a control apparatus for the fuel cell system, a control method of the fuel cell system, a termination processing apparatus for the fuel cell system, an operation stop method of the fuel cell system, a warm-up apparatus for the fuel cell system, a warm-up method of the fuel cell system, a purging apparatus of the fuel cell system, a purging method of the fuel cell system, control of any of these apparatuses, a computer program configured to implement any of these methods and a non-transitory storage medium in which any of such computer programs is stored.

DESCRIPTION OF EMBODIMENTS

A. First Embodiment

A1. Configuration of Fuel Cell System

Figure 1:
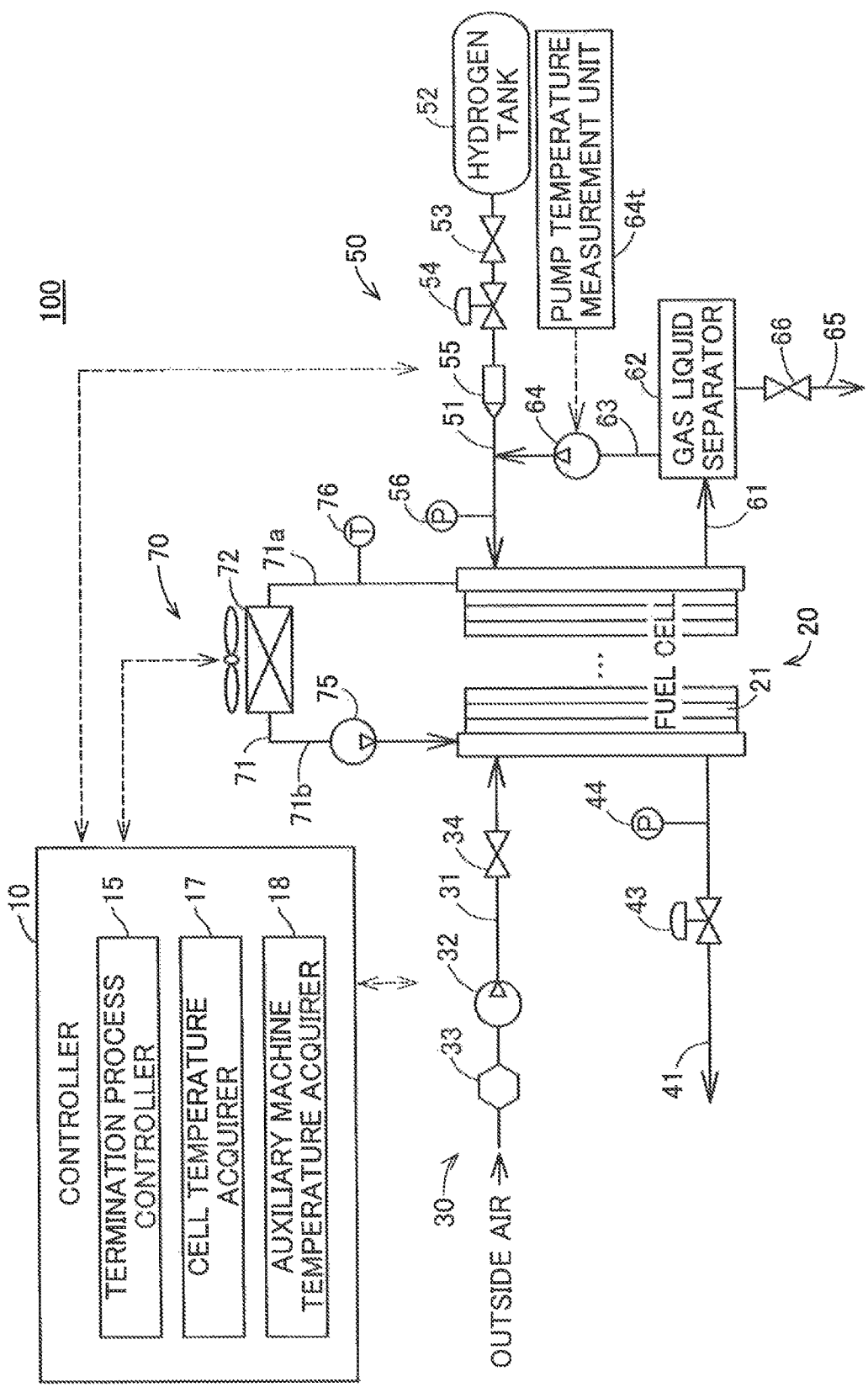
FIG. 1 is a schematic diagram illustrating the configuration of a fuel cell system according to a first embodiment.

FIG. 1 is a schematic diagram illustrating the configuration of a fuel cell system 100 according to one embodiment of the invention. This fuel cell system 100 is mounted on a fuel cell vehicle and mainly serves to output electric power used as the driving force of the fuel cell vehicle in response to a driver's request. The fuel cell system 100 includes a controller 10, a fuel cell 20, a cathode gas supply discharge system 30, an anode gas supply discharge circulation system 50 and a cooling medium supply system 70.

The controller 10 is configured by a microcomputer including a central processing unit and a main storage unit. The controller 10 loads and executes a program on the main storage unit to provide various functions. The controller 10 controls the respective components 30, 50 and 70 described below during operation of the fuel cell system 100 to perform power generation control of the fuel cell 20 that causes the fuel cell 20 to generate electric power corresponding to an output request.

According to this embodiment, the controller 10 serves as a termination process controller 15 that performs a termination process when operation of the fuel cell system 100 is stopped. The fuel cell system 100 of the embodiment performs a purging process in the termination process under a low temperature environment, so as to suppress water from being left in the fuel cell system 100 after a stop of operation. The details of the termination process will be described later.

Additionally, according to this embodiment, the controller 10 also serves as a cell temperature acquirer 17 and an auxiliary machine temperature acquirer 18. The cell temperature acquirer 17 obtains a cell temperature $T_{FC}$ that indicates temperature of the fuel cell 20, based on a measurement result of a temperature measurement unit 76 in the cooling medium supply system 70. The auxiliary machine temperature acquirer 18 obtains an auxiliary machine temperature $T_{AM}$ that indicates temperature of a hydrogen pump 64, via a pump temperature measurement unit 64t provided in the hydrogen pump 64 of the anode gas supply discharge circulation system 50. The cell temperature $T_{FC}$ and the auxiliary machine temperature $T_{AM}$ are used in the termination process.

The fuel cell 20 is a polymer electrolyte fuel cell that receives supplies of a fuel gas and an oxidizing gas as reactive gases and generates electric power. The fuel gas is hydrogen and the oxidizing gas is oxygen in this embodiment. The fuel cell 20 has a stack structure by stacking a plurality of unit cells 21. Each of the unit cells 21 is a power generating unit that is capable of generating electricity alone. Each unit cell 21 includes a membrane electrode assembly and two separators. The membrane electrode assembly is a power generation element having electrodes placed on the respective surfaces of an electrolyte membrane. The electrolyte membrane is formed from a solid polymer thin film that shows the good proton conductivity in the wet state containing water inside. The separators are placed across the membrane electrode assembly. The separators are not shown in figures.

The cathode gas supply discharge system 30 serves to supply the oxidizing gas to a cathode side of the fuel cell 20 and discharge a cathode off-gas and drained water from the cathode side of the fuel cell 20 out of the fuel cell system 100. The cathode gas supply discharge system 30 includes a cathode gas pipe 31, an air compressor 32, an air flowmeter 33 and an on-off valve 34 as the supply system of the oxidizing gas. The cathode gas pipe 31 is connected with a cathode-side inlet of the fuel cell 20. The air compressor 32 is connected with the fuel cell 20 via the cathode gas pipe 31 and is configured to compress the intake air taken in from the outside air and supply the compressed air to the fuel cell 20.

The air flowmeter 33 is placed on the upstream side of the air compressor 32 to measure the amount of the outside air taken in by the air compressor 32 and send the measurement value of the controller 10. The controller 10 operates the air compressor 32 based on the received measurement value, so as to regulate the amount of the air that is to be supplied to the fuel cell 20. The on-off valve 34 is provided between the air compressor 32 and the fuel cell 20. The on-off valve 34 is normally closed, and is opened when the air of a predetermined pressure is supplied from the air compressor 32 to the cathode gas pipe 31.

The cathode gas supply discharge system 30 further includes a cathode off-gas pipe 41, a pressure regulator 43 and a pressure measurement unit 44 as the discharge system of the oxidizing gas. The cathode off-gas pipe 41 is connected with a cathode-side outlet of the fuel cell 20 and is configured to discharge the cathode off-gas and the drained water out of the fuel cell system 100. The pressure regulator 43 is a regulating valve. The pressure regulator 43 regulates the pressure of the cathode off-gas in the cathode off-gas pipe 41. The pressure of the cathode off-gas is back pressure on the cathode side of the fuel cell 20. The pressure measurement unit 44 is placed on the upstream side of the pressure regulator 43 to measure the pressure of the cathode off-gas and send the measurement value to the controller 10. The controller 10 regulates the opening of the pressure regulator 43, based on the measurement value of the pressure measurement unit 44.

The anode gas supply discharge circulation system 50 serves to supply the fuel gas to an anode side of the fuel cell 20. The anode gas supply discharge system 50 also serves to discharge an anode off-gas and drained water from the anode side of the fuel cell 20 out of the fuel cell system 100 and serves to circulate the anode off-gas in the fuel cell system 100.

The anode gas supply discharge circulation system 50 includes an anode gas pipe 51, a hydrogen tank 52, an on-off valve 53, a regulator 54, a hydrogen supply device 55 and a pressure measurement unit 56 as the supply system of the fuel gas. The hydrogen tank 52 is filled with high-pressure hydrogen that is to be supplied to the fuel cell 20. The hydrogen tank 52 is connected with an anode-side inlet of the fuel cell 20 via the anode gas pipe 51.

The on-off valve 53, the regulator 54, the hydrogen supply device 55 and the pressure measurement unit 56 are provided in this sequence from the upstream side in the anode gas pipe 51. In the supply system of the fuel gas, the upstream side is the hydrogen tank 52-side. The on-off valve 53 is a valve provided to control the inflow of hydrogen from the hydrogen tank 52 to the upstream side of the hydrogen supply device 55. The opening and closing operations of the on-off valve 53 are controlled by the controller 10.

The regulator 54 is a pressure reducing valve operated to regulate the pressure of hydrogen on the upstream side of the hydrogen supply device 55. The degree of the opening of the regulator 54 is controlled by the controller 10. The hydrogen supply device 55 is configured by, for example, an injector that is a solenoid-operated on-off valve. The pressure measurement unit 56 measures the pressure of hydrogen on the downstream side of the hydrogen supply device 55 and sends the measurement value to the controller 10. The controller 10 controls a driving period that indicates the on-off timing of the hydrogen supply device 55, based on the measurement value of the pressure measurement unit 56, so as to regulate the amount of hydrogen that is to be supplied to the fuel cell 20.

The anode gas supply discharge circulation system 50 includes an anode off-gas pipe 61, a gas liquid separator 62, an anode gas circulation pipe 63, a hydrogen pump 64, an anode drainage pipe 65 and a drainage valve 66 as the discharge circulation system of the fuel gas. The anode off-gas pipe 61 is connected with an anode-side outlet of the fuel cell 20 and the gas liquid separator 62.

The gas liquid separator 62 is connected with the anode gas circulation pipe 63 and the anode drainage pipe 65. The anode off-gas flowing through the anode off-gas pipe 61 into the gas liquid separator 62 is separated into a gas component and water by the gas liquid separator 62. In the gas liquid separator 62, the gas component of the anode off-gas is guided to the anode gas circulation pipe 63, while the separated water is guided to the anode drainage pipe 65.

The anode gas circulation pipe 63 is connected with the anode gas pipe 51 on the downstream side of the hydrogen supply device 55. The anode gas circulation pipe 63 is provided with the hydrogen pump 64. The hydrogen pump 64 serves as a circulation pump to feed hydrogen included in the gas component separated by the gas liquid separator 62 to the anode gas pipe 51. The controller 10 obtains the current rotation speed of the hydrogen pump 64 via an encoder included in the hydrogen pump 64 and uses the obtained rotation speed for operation control of the hydrogen pump 64. The encoder is not shown in figures.

According to this embodiment, the hydrogen pump 64 is provided with a pump temperature measurement unit 64$t$. As described above, according to this embodiment, the auxiliary machine temperature acquirer 18 obtains the measured value of temperature of the hydrogen pump 64 by the pump temperature measurement unit 64$t$ as the auxiliary machine temperature $T_{AM}$. The hydrogen pump 64 of the embodiment corresponds to the more specific concept of the gas-flowing auxiliary machine of the invention. The auxiliary machine temperature $T_{AM}$ corresponds to the more specific concept of the auxiliary machine temperature information of the invention.

The anode drainage pipe 65 is provided with the drainage valve 66. The drainage valve 66 is opened and closed in response to commands from the controller 10. The controller 10 normally closes the drainage valve 66 and opens the drainage valve 66 at predetermined water drainage timings and at discharge timings of an inert gas included in the anode off-gas. A downstream end of the anode drainage pipe 65 is joined with the cathode off-gas pipe 41 to cause the drained water on the anode side and the anode off-gas to be mixed with the drained water on the cathode side and the cathode off-gas and discharged, although not being specifically illustrated.

The cathode gas supply discharge system 30 and the anode gas supply discharge circulation system 50 correspond to the more specific concept of the reactive gas supplier of the invention. According to this embodiment, a warm-up process is performed to increase the temperature of the fuel cell 20 in the termination process performed by the termination process controller 15. In the warm-up process, the cathode gas supply discharge system 30 and the anode gas supply discharge circulation system 50 serve as a warm-up operation performer to supply the reactive gas to the fuel cell 20. According to this embodiment, a purging process is performed to purge inside of the fuel cell 20 and inside of the fuel cell system 100 in the termination process performed by the termination process controller 15. In the purging process, the air compressor 32 of the cathode gas supply discharge system 30 and the hydrogen pump 64 of the anode gas supply discharge circulation system 50 serve as a purging performer to supply the reactive gas as a purge gas. The details of the warm-up process and the purging process will be described later.

The cooling medium supply system 70 includes a cooling medium pipe 71, a radiator 72 and a circulation pump 75. The cooling medium pipe 71 is a pipe arranged to circulate a cooling medium used to cool down the fuel cell 20 and includes an upstream pipe 71a and a downstream pipe 71b. The upstream pipe 71a is arranged to connect an outlet of a cooling medium flow path in the fuel cell 20 with an inlet of the radiator 72. The downstream pipe 71b is arranged to connect an inlet of the cooling medium flow path in the fuel cell 20 with an outlet of the radiator 72. The radiator 72 has a fan configured to take in the outside air and serves to cool down the cooling medium through heat exchange between the cooling medium in the cooling medium pipe 71 and the outside air. The circulation pump 75 is provided in the downstream pipe 71b. The cooling medium is flowed in the cooling medium pipe 71 by the driving force of the circulation pump 75.

According to this embodiment, the cooling medium supply system 70 is provided with a temperature measurement unit 76 to measure the temperature of the fuel cell 20. The temperature measurement unit 76 is provided in the upstream pipe 71a of the cooling medium supply system 70. As described above, the cell temperature acquirer 17 obtains the cell temperature $T_{FC}$ that indicates temperature of the fuel cell 20, based on the measured value of temperature of the cooling medium that is discharged from the fuel cell 20, by the temperature measurement unit 76. The cell temperature $T_{FC}$ corresponds to the more specific concept of the cell temperature information of the invention.

Additionally, the fuel cell system 100 of the embodiment includes at least a secondary battery and a DC-DC converter as the electrical system. The secondary battery stores electric power output from the fuel cell 20 and regenerative electric power and serves as a power source, along with the fuel cell 20. The DC-DC converter controls charging and discharging of the secondary battery and controls the output voltage of the fuel cell 20. The DC-DC converter is not shown in figures.

A2. Termination Process of Fuel Cell System

Figure 2:
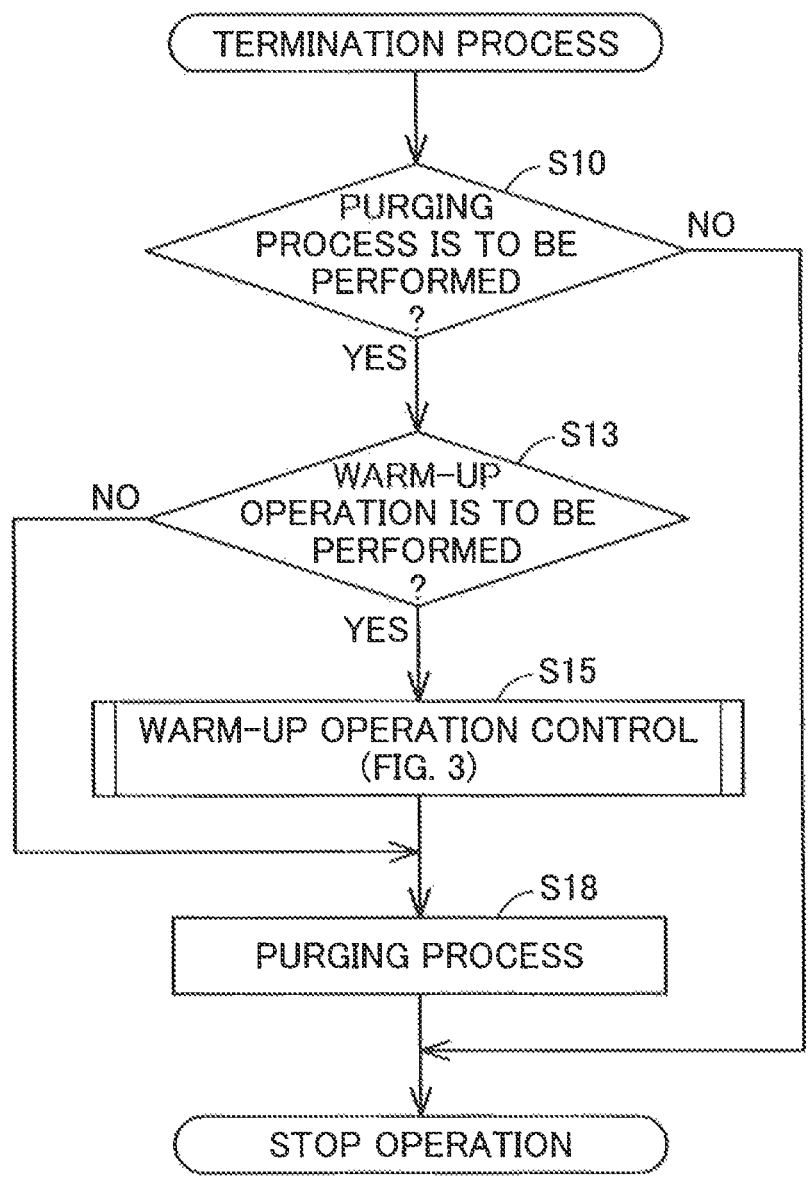
FIG. 2 is a chart showing a flow of termination process according to the first embodiment.

FIG. 2 is a chart showing a flow of termination process performed by the termination process controller 15 in the fuel cell system 100 of the first embodiment. The termination process controller 15 performs a termination process described below when operation of the fuel cell system 100 is to be stopped, for example, in response to detection of a stop operation of the fuel cell vehicle by the driver. The stop operation includes, for example ignition-off operation.

At step S10, the termination process controller 15 determines whether a purging process is to be performed or not. The purging process supplies a purge gas to the fuel cell 20 and the flow passages of the reactive gases and the off-gases, in order to reduce the amount of remaining water. The details of the purging process will be described later. The termination process controller 15 determines that the purging process is to be performed, when the ambient temperature is likely to drop to the freezing point during stop of the system. For example, the termination process controller 15 may determine that the purging process is to be performed, when the ambient temperature obtained by an ambient temperature sensor or the like, which is not shown in the figures, is lower than 10° C. or when the present moment is detected as a winter midnight based on the date information and the time information. In another example, the termination process controller 15 may determine that the purging process is to be performed, when it is detected that a large amount of water remains in the fuel cell 20 or in the system, based on the current resistance value of the fuel cell 20 or based on information representing an operation record of the fuel cell 20 such as the amount of power generation prior to a stop of operation of the fuel cell system 100. When the ambient temperature is unlikely to drop to the freezing point during stop of the system, the termination process controller 15 stops operation of the fuel cell system 100 without performing the purging process.

At step S13, the termination process controller 15 determines whether a warm-up operation is to be performed or not, based on the cell temperature $T_{FC}$ obtained by the cell temperature acquirer 17 and the auxiliary machine temperature $T_{AM}$ obtained by the auxiliary machine temperature acquirer 18. The warm-up operation denotes an operation that causes the fuel cell 20 to generate electric power for the purpose of increasing the temperature of the fuel cell 20 and corresponds to the more specific concept of the warm-up process of the invention. The termination process controller 15 determines that the warm-up operation is to be performed, when the cell temperature $T_{FC}$ and the auxiliary machine temperature $T_{AM}$ are temperatures that are likely to cause water in the hydrogen pump 64 to be frozen during the purging process. Accordingly the termination process controller 15 determines that the warm-up operation is to be performed, when the cell temperature $T_{FC}$ is lower than a first temperature $T_{f1}$ described later and the auxiliary machine temperature $T_{AM}$ is lower than an auxiliary machine reference temperature $T_a$ described later. More specifically, the termination process controller 15 determines that the warm-up operation is to be performed, when the cell temperature $T_{FC}$ is lower than 50° C. and the auxiliary machine temperature $T_{AM}$ is lower than 10° C.

When determining that the warm-up operation is not to be performed at step S13, the termination process controller 15 starts the purging process at step S18 without performing warm-up operation control of step S15. This suppresses the warm-up operation from being performed uselessly and thereby suppresses the system efficiency from decreasing.

When determining that the warm-up operation is to be performed at step S13, on the other hand, the termination process controller 15 performs warm-up operation control at step S15. The warm-up operation control performs the warm-up operation to efficiently increase the temperature of the fuel cell 20 and the temperature of the auxiliary machines such as the hydrogen pump 64 which the off-gas of the fuel cell 20 is flowed through, as described later. The warm-up operation control increases the temperature of the purge gas that is flowed in the purging process performed subsequently and also suppresses water from being frozen in the auxiliary machines, thus efficiently enhancing the effect of removing the remaining water by the purging process. The electric power generated by the fuel cell 20 during the warm-up operation is consumed by the auxiliary machines, such as the air compressor 32 and the hydrogen pump 64 in the fuel cell system 100, and the surplus electric power is stored in the secondary battery. The details of the warm-up operation control will be described later.

In the purging process at step S18, the termination process controller 15 drives the air compressor 32 of the cathode gas supply discharge system 30 to take in the outside air and supply the intake outside air as a purge gas to the cathode side of the fuel cell 20. The termination process controller 15 also closes the on-off valve 53 of the anode gas supply discharge circulation system 50 to stop the operation of the hydrogen supply device 55 and drives the hydrogen pump 64. This causes the gas remaining in the circulation passage of the anode gas in the fuel cell system 100 to be circulated and supplied as the purge gas and purge the circulation passage.

A3. Warm-Up Operation Control

Figure 3:
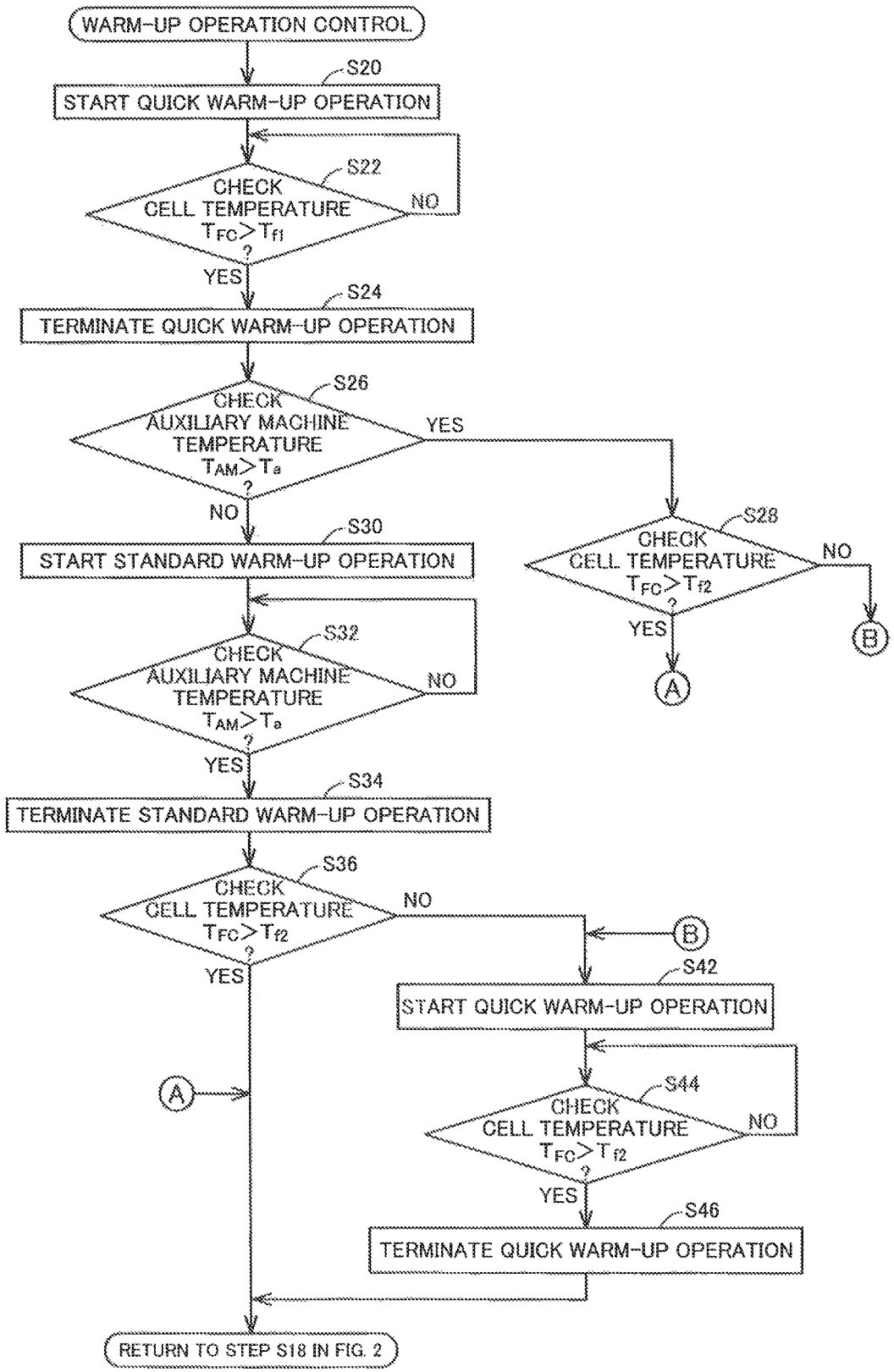
FIG. 3 is a chart showing a flow of warm-up operation control according to the first embodiment.

FIG. 3 is a chart showing a flow of the warm-up operation control according to the first embodiment. As described above, the warm-up operation denotes the operation that causes the fuel cell 20 to generate electric power for the purpose of increasing the temperature of the fuel cell 20. The warm-up operation performed in the fuel cell system 100 of the embodiment includes two different types of warm-up operations, "standard warm-up operation" and "quick warm-up operation". The warm-up operation control appropriately changes over between the standard warm-up operation and the quick warm-up operation. The following first describes the difference between the standard warm-up operation and the quick warm-up operation and subsequently describes the flow of the warm-up operation control.

The standard warm-up operation denotes a warm-up operation having a relatively low temperature rise rate of the fuel cell 20. The ratio of the supply amount of the oxidizing gas to the supply amount of the fuel gas in the standard warm-up operation is substantially equivalent to the ratio during normal driving of the fuel cell vehicle. More specifically, the standard warm-up operation of the embodiment controls the supply amount of the reactive gas such that the supply amount of the oxidizing gas actually supplied to the fuel cell 20 is approximately 1.5 times to 2.0 times as large as the required amount of the oxidizing gas theoretically determined according to the amount of power generation of the fuel cell 20 based on the reaction formula of power generation reaction. The power generation control of the fuel cell 20 in the standard warm-up operation may be substantially identical with power generation control performed during idling of the fuel cell vehicle. From this point of view, the standard warm-up operation may be interpreted as one aspect of normal operation that provides normal power generation control of the fuel cell 20. The standard warm-up operation corresponds to the more specific concept of the first warm-up process of the invention.

The quick warm-up operation is, on the other hand, performed for the purpose of increasing the temperature of the fuel cell 20 in a shorter time period and denotes a warm-up operation having a higher temperature rise rate of the fuel cell 20 than that of the standard warm-up operation. The "temperature rise rate of the fuel cell 20" denotes an amount of temperature rise of the fuel cell 20 per unit time. The temperature rise rate of the fuel cell 20 in the quick warm-up operation of the embodiment is made higher than the temperature rise rate in the standard warm-up operation by the power generation control of the fuel cell 20. The quick warm-up operation of the embodiment supplies the reactive gas to the fuel cell 20 such that the ratio of the supply amount of the oxidizing gas to the required amount of the oxidizing gas determined according to the amount of power generation of the fuel cell 20 described above is made lower than the ratio in the standard warm-up operation. More specifically, the quick warm-up operation of the embodiment controls the supply of the reactive gas such that the actual supply amount of the oxidizing gas is substantially equal to the required amount of the oxidizing gas theoretically determined according to the amount of power generation of the fuel cell 20 based on the reaction formula of power generation reaction. The quick warm-up operation accordingly has the lower power generation efficiency of the fuel cell 20 than that of the standard warm-up operation and thereby accelerates the generation of heat. This results in increasing the temperature rise rate of the fuel cell 20 to be higher than the temperature rise rate in the standard warm-up operation. The quick warm-up operation corresponds to the more specific concept of the second warm-up process of the invention. The fuel cell system 100 of the embodiment readily changes over between the standard warm-up operation and the quick warm-up operation by simply changing the ratio of the supply amount of the oxidizing gas to the supply amount of the fuel gas.

At step S20 of the warm-up operation control, the termination process controller 15 firstly starts the quick warm-up operation to increase the temperature of the fuel cell 20 in a short time period. As described above with regard to the control of the termination process, the warm-up operation control is started when the cell temperature $T_{FC}$ is low, so that it is desirable to quickly warm up the fuel cell 20.

At step S22, the termination process controller 15 checks the cell temperature $T_{FC}$. The termination process controller 15 continues the quick warm-up operation while the cell temperature $T_{FC}$ is equal to or lower than a first temperature $T_{f1}$ that is a predetermined reference temperature. The termination process controller 15 terminates the quick warm-up operation when the cell temperature $T_{FC}$ becomes higher than the first temperature $T_{f1}$ at step S24. The first temperature $T_{f1}$ corresponds to the more specific concept of the first cell temperature reference value of the invention. The first temperature $T_{f1}$ is preferably set to a temperature that certainly makes the temperature of the unit cell 21 placed at an end of the fuel cell 20 higher than 0° C. This suppresses the quick warm-up operation from being terminated before the temperatures of all the unit cells 21 in the fuel cell 20 are sufficiently increased.

It is preferable to set the first temperature $T_{f1}$ lower than the standard operating temperature of the fuel cell 20. In the description hereof, the standard operating temperature of the fuel cell 20 means an average operating temperature when the fuel cell 20 is made to continue power generation having the output voltage of 0.8 to 1.0 V in the state of the ambient temperature of 20 to 30° C. It is preferable to set the first temperature $T_{f1}$ to such a low temperature, because of the following reason.

The quick warm-up operation of steps S20 to S24 may be performed in the case where the temperature of the auxiliary machines such as the hydrogen pump 64 is kept lower than 0° C. One example of this case is that the operation of the fuel cell system 100 left in a low temperature environment is stopped immediately after being started up. In this case, when the temperature of the fuel cell 20 reaches a high temperature that is higher than the standard operating temperature, a hot off-gas including a large amount of water vapor flows into the auxiliary machines. This provides a possibility that the water in the off-gas is frozen inside of the auxiliary machines. In order to suppress the water from being frozen inside of the auxiliary machines, it is preferable to terminate the quick warm-up operation of this stage when the cell temperature $T_{FC}$ is the lower temperature than the standard operating temperature of the fuel cell 20.

As described above, it is preferable to set the first temperature $T_{f1}$ to the temperature that sufficiently increases the temperatures of all the unit cells 21 in the fuel cell 20 but is lower than the standard operating temperature of the fuel cell 20. The first temperature $T_{f1}$ is preferably set to, for example, about 50 to 60° C.

A step S26, the termination process controller 15 determines whether the auxiliary machine temperature $T_{AM}$ is higher than a predetermined auxiliary machine reference temperature $T_B$. When the auxiliary machine temperature $T_{AM}$ is equal to or lower than a predetermined auxiliary machine reference temperature $T_a$, the termination process controller 15 starts the standard warm-up operation at step S30. The auxiliary machine reference temperature $T_a$ corresponds to the more specific concept of the auxiliary machine temperature reference value of the invention. The auxiliary machine reference temperature $T_a$ is preferably a temperature ensuring that water is not frozen in the hydrogen pump 64 during the warm-up operation and a subsequent purging process. The auxiliary machine reference temperature $T_a$ may be, for example, about 10 to 20° C. When the auxiliary machine temperature $T_{AM}$ is higher than the auxiliary machine reference temperature $T_a$ at step S26, the control flow proceeds to step S28 and subsequent steps and does not change over to the standard warm-up operation. The control flow of step S28 and subsequent steps will be described after description of the control flow of performing the standard warm-up operation.

The standard warm-up operation of step S30 mainly aims to increase the temperature of the hydrogen pump 64. Increasing the temperature of the hydrogen pump 64 in the warm-up operation control suppresses the water included in the purge gas from being frozen and left inside of the hydrogen pump 64 during a subsequent purging process and thereby enhances the purging effect by the purging process.

According to the experimental findings of the inventors of the present invention, there is only a little difference in amount of temperature rise of the auxiliary machines including the hydrogen pump 64 per unit time between the quick warm-up operation and the standard warm-up operation. In other words, the standard warm-up operation allows to increase the temperature of the hydrogen pump 64, like the quick warm-up operation. According to the embodiment, after the temperature of the fuel cell 20 is increased to a certain level by the quick warm-up operation, the standard warm-up operation that suppresses an abrupt increase in operating temperature of the fuel cell 20 is performed to increase the temperature of the hydrogen pump 64. This suppresses the hydrogen pump 64 from being frozen by the inflow of the off-gas including a large amount of water from the hot fuel cell 20 into the hydrogen pump 64 prior to a temperature rise, and effectively increases the temperature of the hydrogen pump 64. This also enables the temperature of the hydrogen pump 64 to be efficiently increased without uselessly performing the low-efficiency power generation of the fuel cell 20 by the quick warm-up operation.

At step S32, the termination process controller 15 determines whether the auxiliary machine temperature $T_{AM}$ is higher than the predetermined auxiliary machine reference temperature $T_a$ described above. When the auxiliary machine temperature $T_{AM}$ is equal to or lower than the auxiliary machine reference temperature $T_a$, the termination process controller 15 continues the standard warm-up operation. When the auxiliary machine temperature $T_{AM}$ becomes higher than the auxiliary machine reference temperature $T_a$, the termination process controller 15 terminates the standard warm-up operation at step S34 and subsequently determines whether the cell temperature $T_{FC}$ is higher than a second temperature $T_{f2}$ that is a predetermined reference value at step S36. When the cell temperature $T_{FC}$ is higher than the second temperature $T_{f2}$, the termination process controller 15 starts the purging process at step S18 in FIG. 2.

In order to enhance the purging effect by the purging process, it is preferable to set the second temperature $T_{f2}$ to even a slightly higher temperature than the first temperature $T_{f1}$. In order to suppress the temperature of the fuel cell 20 from uselessly becoming high prior to a stop of operation of the fuel cell system 100, on the other hand, it is preferable to set the second temperature $T_{f2}$ approximately equal to the standard operating temperature of the fuel cell 20 or a lower temperature. According to this embodiment, the second temperature $T_{f2}$ is set to 60 to 80° C. The second temperature $T_{f2}$ corresponds to the more specific concept of the second cell temperature reference value of the invention.

When the cell temperature $T_{FC}$ is equal to or lower than the second temperature $T_{f2}$ at step S36, the termination process controller 15 starts the quick warm-up operation again, in order to quickly increase the temperature of the fuel cell 20 at step S42. This second quick warm-up operation is continued until the termination process controller 15 detects that the cell temperature $T_{FC}$ becomes higher than the second temperature $T_{f2}$ at step S44. At this stage, the temperature of the hydrogen pump 64 has already been increased. Even when the temperature of the fuel cell 20 is quickly increased by the quick warm-up operation, this suppresses the hydrogen pump 64 from being frozen. When the cell temperature $T_{FC}$ becomes higher than the second temperature $T_{f2}$, the termination process controller 15 terminates the quick warm-up operation at step S46 and starts the purging process at step S18 in FIG. 2.

According to this embodiment, after the auxiliary machine temperature $T_{AM}$ is increased to be higher than the auxiliary machine reference temperature $T_a$ by the standard warm-up operation, the purging process is performed when the cell temperature $T_{FC}$ is increased to be higher than the second temperature $T_{f2}$. This suppresses the water in the hydrogen pump 64 from being frozen, while increasing the temperature of the purge gas used in the purging process and thereby increasing the removal amount of water by the purge gas. This accordingly enhances the effect of removing the remaining water by the purging process.

The following describes the control flow of step S28 and subsequent steps without performing the standard warm-up operation. When the cell temperature $T_{FC}$ is higher than the second temperature $T_{f2}$ at step S28, this suggests that both the temperature of the hydrogen pump 64 and the temperature of the fuel cell 20 are sufficiently high. The termination process controller 15 accordingly performs the purging process at step S18 in FIG. 2. In this case, after performing the quick warm-up operation, the control flow performs the purging process without changing over to the standard warm-up operation.

When the cell temperature $T_{FC}$ is equal to or lower than the second temperature Tf at step S28, on the other hand, this suggests that the temperature of the hydrogen pump 64 is high enough to suppress the hydrogen pump 64 from being frozen but the temperature of the fuel cell 20 is not sufficiently high. The termination process controller 15 accordingly starts the second quick warm-up operation at step S42. In this case, it may be interpreted that the quick warm-up operation started at step S20 is substantially continued until the cell temperature $T_{FC}$ is increased to be higher than the second temperature $T_{f2}$. After the cell temperature $T_{FC}$ becomes higher than the second temperature $T_{f2}$, the termination process controller 15 performs the purging process according to the flow of steps S44, S46 and step S18 in FIG. 2. As described above, the control flow of this embodiment does not perform the standard warm-up operation when the temperature of the hydrogen pump 64 is high enough to suppress the hydrogen pump 64 from being frozen after the temperature of the fuel cell 20 is increased by the quick warm-up operation. This ensures the high efficiency.

Figure 4:
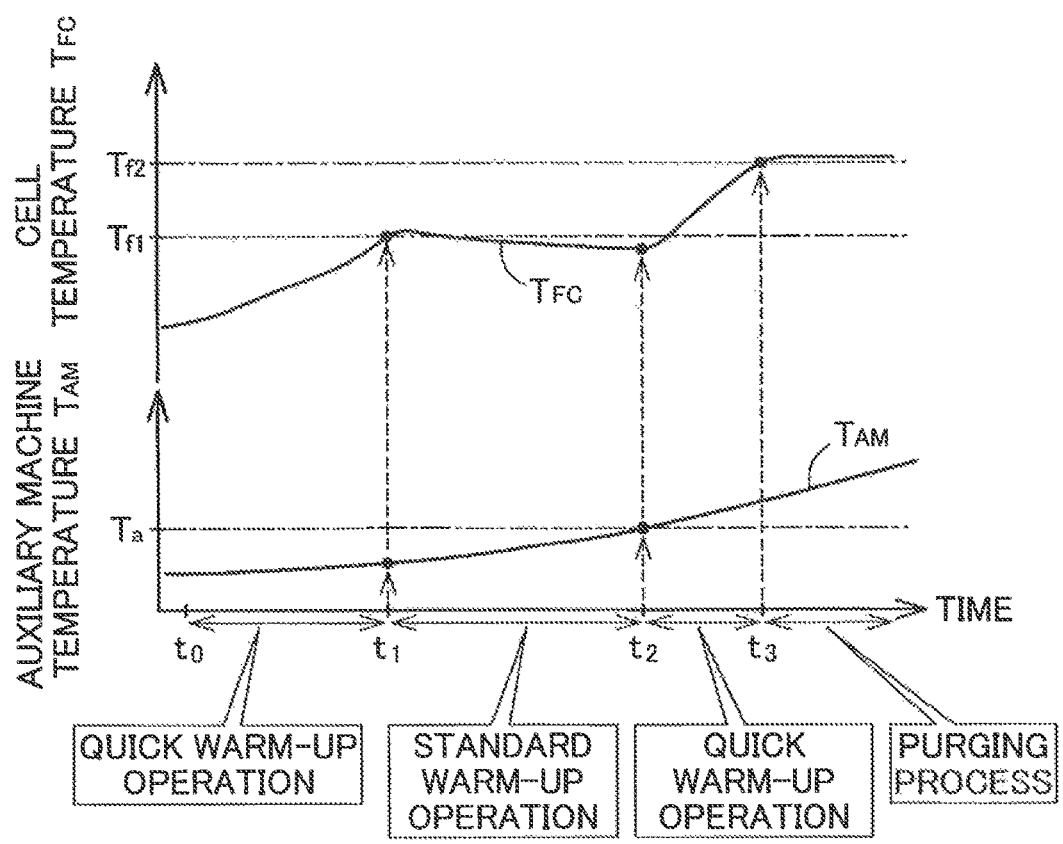
FIG. 4 is a diagram illustrating an example of time chart in the termination process according to the first embodiment.

FIG. 4 is a diagram illustrating an example of time chart indicating execution time periods of the warm-up operations and the purging process in the termination process of the first embodiment. This time chart shows time changes of the cell temperature $T_{FC}$ and the auxiliary machine temperature $T_{AM}$ after a start of the termination process, as well as the respective execution time periods of the quick warm-up operation, the standard warm-up operation and the purging process.

In a period of time to $t_0$ time $t_1$, the quick warm-up operation is performed to quickly increase the cell temperature $T_{FC}$ to the first temperature $T_{f1}$. In this time period, however, the auxiliary machine temperature $T_{AM}$ is only slightly increased. After the changeover to the standard warm-up operation, the increased cell temperature $T_{FC}$ increases the temperature rise rate of the auxiliary machine temperature $T_{AM}$ and accordingly increases the temperature of the hydrogen pump 64 to the auxiliary machine reference temperature $T_a$ during the period from time $t_1$ to time $t_2$. In this illustrated example, however, after the changeover to the standard warm-up operation, the cell temperature $T_{FC}$ is slightly decreased by the effect of the ambient temperature.

At the time $t_2$, the cell temperature $T_{FC}$ is lower than the second temperature $T_{f2}$, so that the standard warm-up operation is changed over to the quick warm-up operation. This increases the temperature rise rate of the fuel cell 20 again to quickly warm up the fuel cell 20 to the second temperature $T_{f2}$ during the period from time $t_2$ to time $t_3$. The purging process is subsequently performed in the state that the cell temperature $T_{FC}$ is higher than the second temperature $T_{f2}$ and the auxiliary machine temperature $T_{AM}$ is higher than the auxiliary machine reference temperature $T_a$.

A4. Conclusions

As described above, the fuel cell system 100 of the embodiment performs the purging process in the termination process when the ambient temperature is likely to drop below zero during stop of the system. This reduces the amount of water remaining in the passages of the reactive gases and the off-gases in the system. This accordingly suppresses deterioration of startability of the fuel cell system 100 caused by freezing of the remaining water. In the fuel cell system 100 of the embodiment, in the case where the temperature of the fuel cell 20 and the temperature of the hydrogen pump 64 are low, the warm-up operation control performs the warm-up operations to increase the temperatures of the fuel cell 20 and the hydrogen pump 64. This increases the removal amount of water by the purge gas in the purging process, while suppressing the water from being frozen in the hydrogen pump 64 and thereby enhancing the effect of removing water by the purging process.

Additionally, in the fuel cell system 100 of the embodiment, the warm-up operation control performs the quick warm-up operation to quickly increase the temperature of the fuel cell 20 and subsequently performs the standard warm-up operation to increase the temperature of the hydrogen pump 64. This increases the temperature of the hydrogen pump 64 along with the temperature of the fuel cell 20, while suppressing the hydrogen pump 64 from being frozen. This warm-up operation control is especially effective, for example, in the case where the operation of the fuel cell system 100 is stopped before the temperatures of the fuel cell 20 and the hydrogen pump 64 are increased sufficiently after start-up of the fuel cell system 100 that is left in a low temperature environment. This control is more effective than a control that continues the quick warm-up operation to suppress the hydrogen pump 64 from being frozen, while suppressing an excessive temperature rise of the fuel cell 20 by cooling down the fuel cell 20 by the cooling medium supply system 70. Moreover, in the fuel cell system 100 of the embodiment, in the case where the standard warm-up operation does not sufficiently increase the temperature of the fuel cell 20 after increasing the temperature of the hydrogen pump 64, the standard warm-up operation is changed over again to the quick warm-up operation. This enables the temperature of the fuel cell 20 to be more certainly increased in a shorter time period. The fuel cell system 100 of the embodiment additionally has various functions and advantageous effects described above with regard to this embodiment.

B. Second Embodiment

Figure 5:
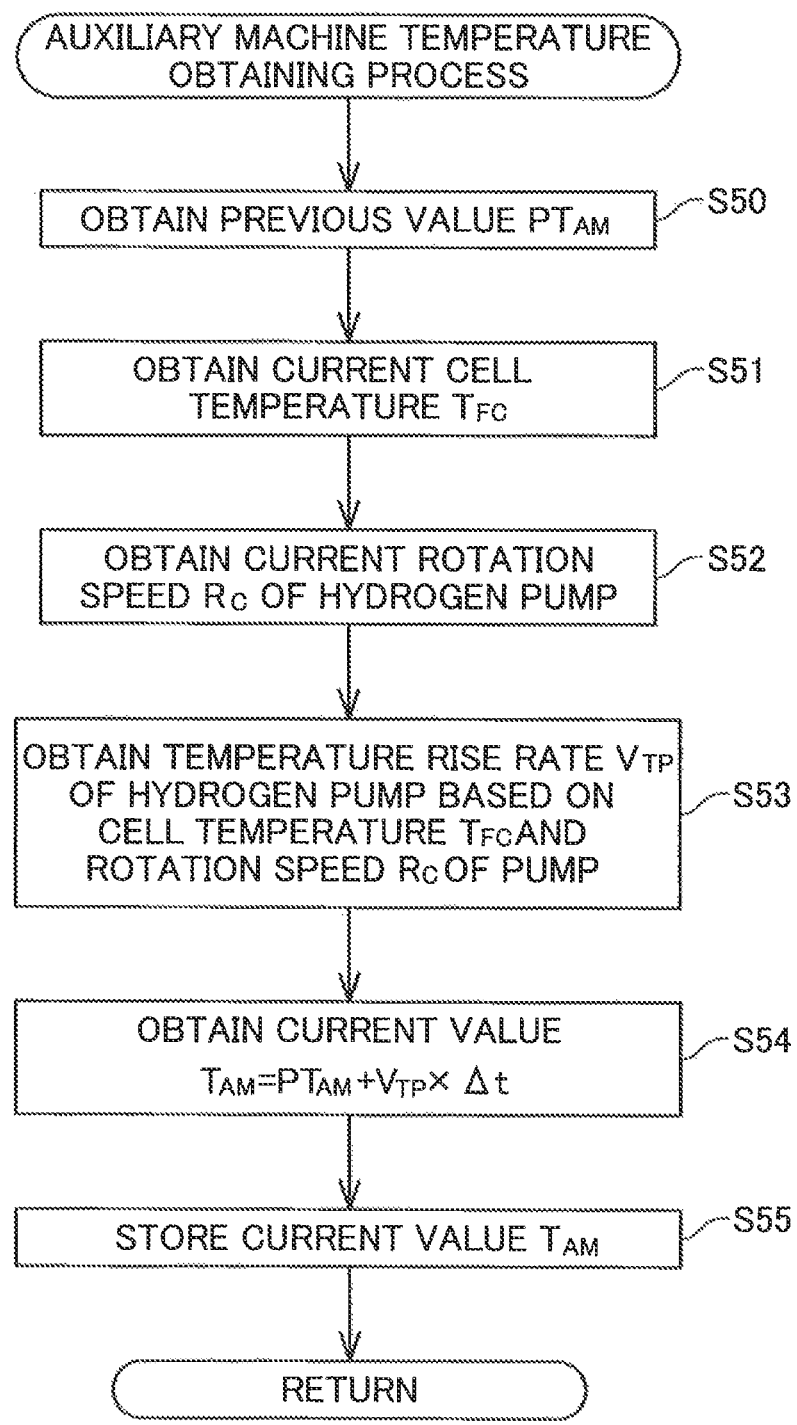
FIG. 5 is a chart showing a flow of auxiliary machine temperature obtaining process according to a second embodiment.

FIG. 5 is a chart showing a flow of auxiliary machine temperature obtaining process performed in a fuel cell system according to a second embodiment of the invention. The fuel cell system of the second embodiment has a configuration substantially similar to the configuration of the fuel cell system 100 of the first embodiment, except that the hydrogen pump 64 is not provided with the pump temperature measurement unit 64t. In the fuel cell system of the second embodiment, the termination process controller 15 performs a termination process shown in FIG. 2 and a warm-up operation control shown in FIG. 3 similar to those described in the first embodiment. In the fuel cell system of the second embodiment, the auxiliary machine temperature acquirer 18 repeatedly and periodically performs an auxiliary machine temperature obtaining process described below not only during the termination process but during operation of the hydrogen pump 64 so as to sequentially update an auxiliary machine temperature $T_{AM}$ that indicates temperature of the hydrogen pump 64. The termination process controller 15 uses the auxiliary machine temperature $T_{AM}$ for the termination process and the warm-up operation control as described above in the first embodiment.

At step S50, the auxiliary machine temperature acquirer 18 reads and obtains a previous value $PT_{AM}$ stored in a storage unit of the controller 10. The storage unit of the controller 10 is not shown in figures. In a first cycle of the auxiliary machine temperature obtaining process, the auxiliary machine temperature acquirer 18 reads an initial value of the previous value $PT_{AM}$ that is stored in a non-volatile manner. The initial value may be set appropriately, based on information regarding the operation record of the fuel cell system 100, the current cell temperature $T_{FC}$ and the current environment temperature.

At step S51, the auxiliary machine temperature acquirer 18 obtains a current cell temperature $T_{FC}$ from the cell temperature acquirer 17. At step S52, the auxiliary machine temperature acquirer 18 obtains a current rotation speed $R_C$ of the hydrogen pump 64 via an encoder (not shown) provided in the hydrogen pump 64. The encoder is not shown in the figures.

At step S53, the auxiliary machine temperature acquirer 18 refers to a map provided in advance to obtain a temperature rise rate $V_{TP}$ of the hydrogen pump 64, based on the current cell temperature $T_{FC}$ and the current rotation speed $R_C$ of the hydrogen pump 64. The "temperature rise rate of the hydrogen pump 64" denotes an amount of temperature rise of the hydrogen pump 64 per unit time.

Figure 6:
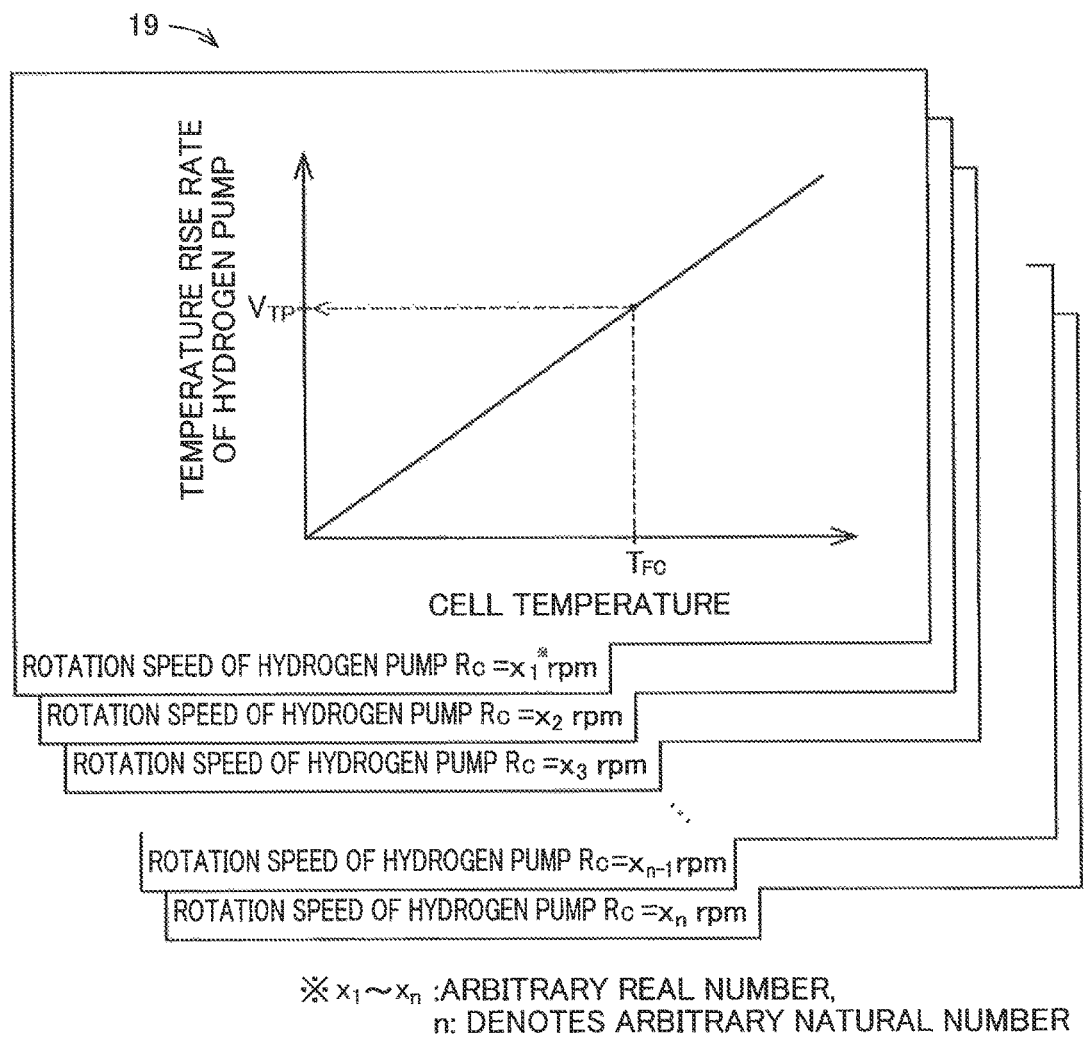
FIG. 6 is a diagram illustrating an example of temperature rise rate map used in the auxiliary machine temperature obtaining process according to the second embodiment.

FIG. 6 is a diagram conceptually illustrating an example of the map used to obtain the temperature rise rate $V_{TP}$ of the hydrogen pump 64 at step S53. This map 19, which is hereinafter referred to as "temperature rise rate map 19", sets a relationship to increase the temperature rise rate $V_{TP}$ of the hydrogen pump 64 with an increase in temperature of the fuel cell 20 with regard to each rotation speed $R_C$ of the hydrogen pump 64.

According to this embodiment, in the temperature rise rate map 19, the temperature rise rate $V_{TP}$ of the hydrogen pump 64 is a value computed based on the flow rate of the anode off-gas determined according to the rotation speed $R_C$ of the hydrogen pump 64 and the amount of heat received by the hydrogen pump 64 from the anode off-gas including water vapor at the saturation amount. The auxiliary machine temperature acquirer 18 obtains the temperature rise rate $V_{TP}$ of the hydrogen pump 64 at the current cell temperature $T_{FC}$, based on the relationship between the temperature of the fuel cell 20 and the temperature rise rate $V_{TP}$ of the hydrogen pump 64 with regard to the current rotation speed $R_C$ of the hydrogen pump 64.

At step S54 shown in FIG. 5, the auxiliary machine temperature acquirer 18 multiplies the temperature rise rate $V_{TP}$ of the hydrogen pump 64 by a short time period Δt corresponding to an execution period of the auxiliary machine temperature obtaining process and adds the previous value $PT_{AM}$ to the product, so as to calculate the current value of the auxiliary machine temperature $T_{AM}$ as the pump temperature shown by Equation (A) given below:

$$T_{AM}=PT_{AM}+V_{TP}\times\Delta t \tag{A}$$

At step S55, the auxiliary machine temperature acquirer 18 stores the obtained current value of the auxiliary machine temperature $T_{AM}$ into the storage unit. The auxiliary machine temperature acquirer 18 reads the current value of the auxiliary machine temperature $T_{AM}$ stored in the storage unit as the previous value $PT_{AM}$ at step S50 in a next cycle of the auxiliary machine temperature obtaining process. The termination process controller 15 reads the current value of the auxiliary machine temperature $T_{AM}$ stored in the storage unit as an estimated value indicating the current temperature of the hydrogen pump 64 and uses the read current value of the auxiliary machine temperature $T_{AM}$ in the termination process and the warm-up operation control.

As described above, the auxiliary machine temperature acquirer 18 of the second embodiment obtains the auxiliary machine temperature $T_{AM}$ that indicates the current temperature of the hydrogen pump 64 by the successive simple arithmetic operations. The auxiliary machine temperature $T_{AM}$ of the second embodiment may be interpreted as an indirectly measured value of the current temperature of the hydrogen pump 64. In the fuel cell system of the second embodiment, the auxiliary machine temperature $T_{AM}$ that indicates the current temperature of the hydrogen pump 64 is obtained by the successive simple arithmetic operations and is used in the termination process and the warm-up operation control. This configuration efficiently allows for omission of the pump temperature measurement unit 64t that directly measures the temperature of the hydrogen pump 64. Additionally, the fuel cell system of the second embodiment has various functions and advantageous effects similar to those described in the first embodiment.

C. Third Embodiment

Figure 7:
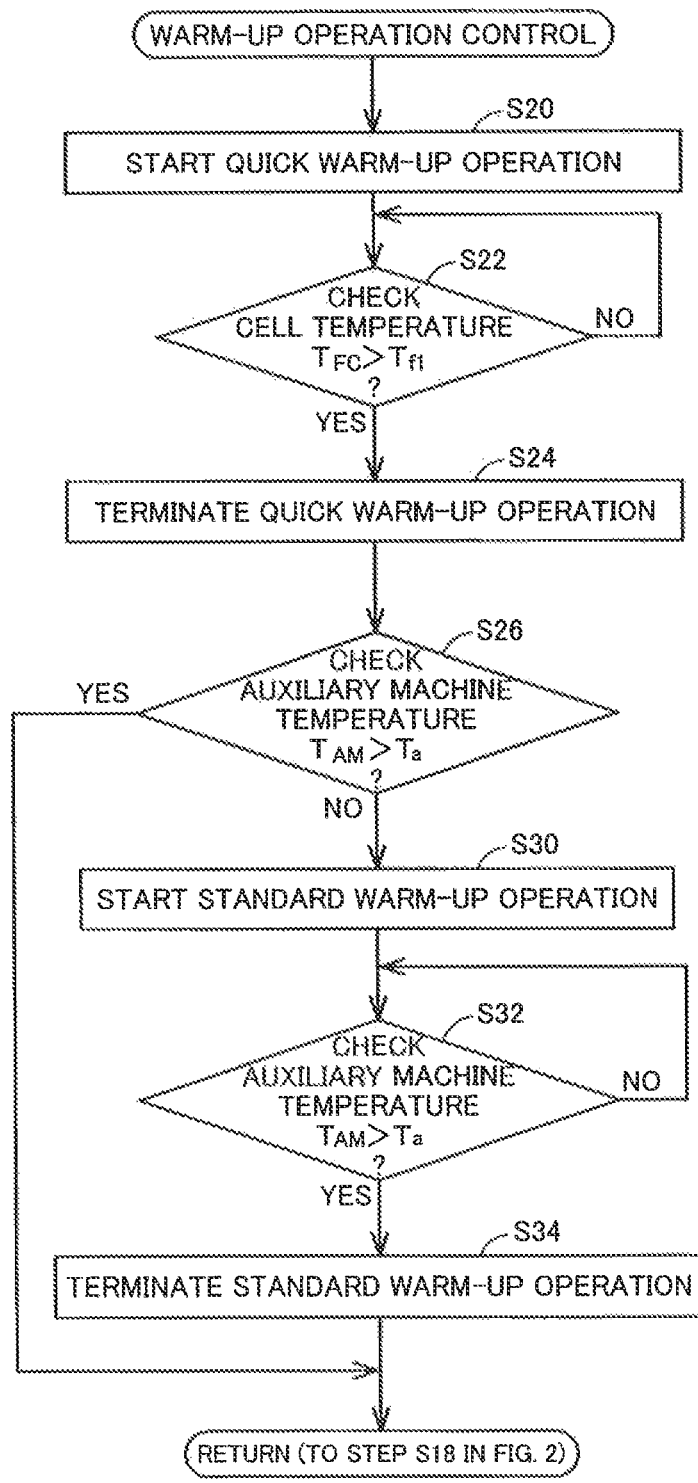
FIG. 7 is a chart showing a flow of warm-up operation control according to a third embodiment.

FIG. 7 is a chart showing a flow of warm-up operation control according to a third embodiment of the invention. A fuel cell system of the third embodiment has a configuration substantially similar to the configuration of the fuel cell system 100 of the first embodiment shown in FIG. 1 and performs a termination process shown in FIG. 2 similar to that described in the first embodiment. A warm-up operation control performed in the fuel cell system of the third embodiment is substantially similar to the warm-up operation control of the first embodiment, except omission of the processing of step S28 and steps S42 to S46. When the auxiliary machine temperature $T_{AM}$ is equal to or lower than the auxiliary machine reference temperature $T_a$ at step S26, the warm-up operation control of the third embodiment changes over to the standard warm-up operation at step S30. When the auxiliary machine temperature $T_{AM}$ becomes higher than the auxiliary machine reference temperature $T_a$ after the changeover to the standard warm-up operation or when the auxiliary machine temperature $T_{AM}$ is already higher than the auxiliary machine reference temperature $T_a$ at step S26, the warm-up operation control performs the purging process at step S18 in FIG. 2. The warm-up operation control of the third embodiment also increases the temperatures of the fuel cell 20 and the hydrogen pump 64 and thereby enhances the purging effect by the purging process. Additionally, the fuel cell system of the third embodiment has various functions and advantageous effects similar to those described in the first embodiment. In the fuel cell system of the third embodiment, the auxiliary machine temperature acquirer 18 may obtain the auxiliary machine temperature $T_{AM}$ according to an auxiliary machine temperature obtaining process that is similar to that described in the second embodiment.

D. Modifications

D1. Modification 1

In the respective embodiments described above, the termination process controller 15 obtains the temperature of the hydrogen pump 64 among the auxiliary machines which the reactive gas or the exhaust gas is flowed through, as the auxiliary machine temperature $T_{AM}$ and controls the warm-up operation based on the obtained auxiliary machine temperature $T_{AM}$, in order to suppress the hydrogen pump 64 from being frozen. According to a modification, the termination process controller 15 may obtain an auxiliary machine temperature $T_{AM}$ that indicates temperature of an auxiliary machine which the off-gas is flowed through, other than the hydrogen pump 64 and may control the warm-up operation based on the obtained auxiliary machine temperature $T_{AM}$. For example, the termination process controller 15 may obtain an auxiliary machine temperature $T_{AM}$ that indicates temperature of the pressure regulator 43 of the cathode gas supply discharge system 30 and may control the warm-up operation based on the obtained auxiliary machine temperature $T_{AM}$ in order to suppress the pressure regulator 43 from being frozen. In other words, the auxiliary machine of the invention which the gas is flowed through is not limited to the hydrogen pump 64 but may be any other auxiliary machine which the off-gas of the fuel cell 20 is flowed through.

D2. Modification 2

In the respective embodiments described above, the amount of temperature rise of the fuel cell 20 per unit time in the quick warm-up operation is increased to be greater than the amount of temperature rise per unit time in the standard warm-up operation by making the power generation efficiency in the quick warm-up operation lower than the power generation efficiency in the standard warm-up operation. According to a modification, the amount of temperature rise of the fuel cell 20 per unit time in the quick warm-up operation may be increased to be greater than the amount of temperature rise per unit time in the standard warm-up operation by another suitable method. The amount of temperature rise of the fuel cell 20 per unit time in the quick warm-up operation may be increased to be greater than the amount of temperature rise per unit time in the standard warm-up operation by changing the operating conditions of the fuel cell 20 by the termination process controller 15. For example, the amount of temperature rise of the fuel cell 20 per unit time in the quick warm-up operation may be increased by increasing the temperature of the cooling medium flowing in the cooling medium supply system 70 under control of the termination process controller 15. In another example, the amount of temperature rise of the fuel cell 20 per unit time in the quick warm-up operation may be increased by heating the fuel cell 20 by heating means such as a heater operated under control of the termination process controller 15.

D3. Modification 3

In the respective embodiments described above, the purging process is performed in both the cathode gas supply discharge system 30 and the anode gas supply discharge circulation system 50. According to a modification, the purging process may be performed in only one of the cathode gas supply discharge system 30 and the anode gas supply discharge circulation system 50. In the case where the purging process is performed in only the cathode gas supply discharge system 30, it is preferable to perform the warm-up operation control based on an auxiliary machine temperature $T_{AM}$ that indicates temperature of an auxiliary machine, for example pressure regulator 43, which is included in the cathode gas supply discharge system 30 and which the off-gas is flowed through, in place of the hydrogen pump 64.

D4. Modification 4

In the first embodiment described above, the auxiliary machine temperature acquirer 18 obtains the measured value of temperature of the hydrogen pump 64 by the pump temperature measurement unit 64t, as the auxiliary machine temperature $T_{AM}$. In the second embodiment described above, the auxiliary machine temperature acquirer 18 obtains the estimated value of temperature of the hydrogen pump 64, as the auxiliary machine temperature $T_{AM}$. The auxiliary machine temperature $T_{AM}$ may thus be any parameter indicating temperature of an auxiliary machine such as the hydrogen pump 64 that is a target for which freezing of water is suppressed. The auxiliary machine temperature $T_{AM}$ may also be obtained by any suitable method other than those described in the above embodiments. For example, the auxiliary machine temperature $T_{AM}$ may be obtained based on a measurement value of a temperature sensor that is provided in a pipe on the downstream side of the hydrogen pump 64. In the respective embodiments described above, the cell temperature acquirer 17 obtains the cell temperature $T_{FC}$ indicating temperature of the fuel cell 20 as the indirect measured value, based on the temperature of the cooling medium that is correlated to the temperature of the fuel cell 20. According to a modification, the cell temperature $T_{FC}$ may be obtained by another suitable method. The cell temperature acquirer 17 may obtain any parameter indicating temperature of the fuel cell 20 as the cell temperature $T_{FC}$. For example, the cell temperature $T_{FC}$ may be obtained as a measured value of temperature of the fuel cell 20 that is directly measured by a temperature sensor. In another example, the cell temperature $T_{FC}$ may be obtained as an estimated value based on the power generation condition of the fuel cell 20 or based on a change in power generation characteristic.

D5. Modification 5

In the respective embodiments described above, the termination process controller 15 performs the warm-up operation control based on the cell temperature $T_{FC}$ and the auxiliary machine temperature $T_{AM}$. According to a modification, the termination process controller 15 may perform the warm-up operation control, based on cell temperature information regarding the temperature of the fuel cell 20 other than the cell temperature $T_{FC}$ or based on auxiliary machine temperature information regarding the temperature of the hydrogen pump 64 other than the auxiliary machine temperature $T_{AM}$. The cell temperature information may be any information relating to the temperature condition of the fuel cell 20. The cell temperature information includes the cell temperature $T_{FC}$ and also includes information other than the cell temperature $T_{FC}$ that allows the current temperature of the fuel cell 20 to be determined indirectly, for example, information regarding the operation record of the fuel cell 20 or information regarding the environment temperature in which the fuel cell 20 is placed. The information regarding the environment temperature includes date information and time information regarding the current date and time that allow a current temperature trend to be determined indirectly, as well as the temperature measurement value. Similarly the auxiliary machine temperature information may be any information relating to the temperature condition of an auxiliary machine as a target such as the hydrogen pump 64. The auxiliary machine temperature information includes the auxiliary machine temperature $T_{AM}$ and also includes information other than the auxiliary machine temperature $T_{AM}$ that allows the current temperature of the hydrogen pump 64 to be determined indirectly, for example, information regarding the operation record of the hydrogen pump 64 or information regarding the environment temperature in which the hydrogen pump 64 is placed. In the termination process, when it is estimated that the temperature of the fuel cell 20 is equal to or lower than the first temperature $T_{f1}$ described in the above respective embodiments and the temperature of the hydrogen pump 64 is equal to or lower than the auxiliary machine reference temperature $T_a$ described in the above respective embodiments, based on the cell temperature information and the auxiliary machine temperature information described above, the termination process controller 15 may determine that the warm-up operation control of step S15 is to be performed. According to another modification, the termination process controller 15 may determine respective execution time periods of the quick warm-up operation and the standard warm-up operation, based on the cell temperature information and the auxiliary machine temperature information, and may sequentially perform the quick warm-up operation and the standard warm-up operation for the respective determined execution time periods.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A fuel cell system, comprising:
   a fuel cell;
   a reactive gas supplier that is configured to supply a reactive gas to the fuel cell;
   a gas-flowing auxiliary machine that is provided in a passage which an off-gas discharged from the fuel cell flows through and is used in controlling flow of the off-gas;
   a termination process controller that is configured to control execution of a termination process when operation of the fuel cell is to be stopped;
   a cell temperature acquirer that is configured to obtain cell temperature information that is information regarding temperature of the fuel cell; and
   an auxiliary machine temperature acquirer that is configured to obtain auxiliary machine temperature information that is information regarding temperature of the gas-flowing auxiliary machine, wherein
   in the termination process, the termination process controller is configured to perform:
      a first warm-up process that causes the reactive gas supplier to supply the reactive gas to the fuel cell and thereby causes the fuel cell to generate electric power, so as to generate heat in the fuel cell;
      a second warm-up process that controls an operating condition of the fuel cell so that an amount of temperature rise of the fuel cell per unit time in the second warm-up process is greater than an amount of temperature rise in the first warm-up process; and
      a purging process that causes the reactive gas supplier to supply the reactive gas as a purge gas to the fuel cell, so as to purge at least the fuel cell and the gas-flowing auxiliary machine, wherein
   the termination process includes a process of performing the second warm-up process, subsequently performing the first warm-up process and then performing the purging process, based on the cell temperature information and the auxiliary machine temperature information.

2. The fuel cell system according to claim 1,
   wherein the cell temperature acquirer directly or indirectly measures the temperature of the fuel cell and obtains a cell temperature indicating the temperature of the fuel cell as the cell temperature information,
   the auxiliary machine temperature acquirer directly or indirectly measures the temperature of the gas-flowing auxiliary machine and obtains an auxiliary machine temperature indicating the temperature of the gas-flowing auxiliary machine as the auxiliary machine temperature information, and
   the termination process controller changes over from the second warm-up process to the first warm-up process, when the cell temperature becomes higher than a predetermined first cell temperature reference value and the auxiliary machine temperature is equal or lower than a predetermined auxiliary machine temperature reference value after a start of the second warm-up process, and the termination process controller performs the purging process when the cell temperature becomes higher than a predetermined second cell temperature reference value that is higher than the first cell temperature reference value.

3. The fuel cell system according to claim 2,
   wherein after a changeover from the second warm-up process to the first warm-up process and a start of the first warm-up process, when the auxiliary machine temperature becomes higher than the auxiliary machine temperature reference value, the termination process controller performs the second warm-up process again in a state that the cell temperature is lower than the second cell temperature reference value.

4. The fuel cell system according to claim 1,
   wherein the termination process controller decreases a supply amount of an oxidizing gas included in the reactive gas relative to an amount of power generation of the fuel cell in the second warm-up process to be less than a supply amount of the oxidizing gas in the first warm-up process, so as to increase the amount of temperature rise of the fuel cell per unit time in the second warm-up process.

* * * * *